(12) United States Patent
Villers et al.

(10) Patent No.: US 7,788,968 B2
(45) Date of Patent: Sep. 7, 2010

(54) SYSTEM AND METHOD FOR SELF-VERIFICATION OF SAFE STORAGE WITHIN HERMETICALLY SEALED CONTAINERS

(75) Inventors: Philippe Villers, Concord, MA (US); Tom De Bruin, Kibbutz HaOgen (IL); Shlomo Navarro, Holon (IL)

(73) Assignee: GrainPro, Inc., Concord, MA (US)

( * ) Notice: Subject to any disclaimer, the term of this patent is extended or adjusted under 35 U.S.C. 154(b) by 530 days.

(21) Appl. No.: 11/677,636

(22) Filed: Feb. 22, 2007

(65) Prior Publication Data

US 2008/0202213 A1    Aug. 28, 2008

(51) Int. Cl.
     *G01M 3/34* (2006.01)
(52) U.S. Cl. ...................................... 73/49.3
(58) Field of Classification Search ............ 73/40, 73/49.2, 49.3
See application file for complete search history.

(56) References Cited

U.S. PATENT DOCUMENTS

| | | |
|---|---|---|
| 234,185 A | 11/1880 | Hendrick |
| 1,340,718 A | 5/1920 | Johnson |
| 2,624,886 A | 1/1953 | Herman |
| 2,730,150 A | 1/1956 | Wunderwald et al |
| 2,914,776 A | 12/1959 | Hotz |
| 3,485,635 A | 12/1969 | Fassauer |
| 3,727,656 A | 4/1973 | Luders |
| 3,949,527 A | 4/1976 | Double et al. |
| 4,084,358 A | 4/1978 | Winters |
| 4,208,443 A | 6/1980 | Kanuch et al. |
| 4,224,770 A | 9/1980 | Petty |
| 4,413,029 A | 11/1983 | Handwerker |
| 4,508,737 A | 4/1985 | Forest et al. |
| 4,660,337 A | 4/1987 | Ross et al. |
| 4,729,198 A | 3/1988 | Nethery |
| 4,897,970 A | 2/1990 | Double et al. |
| 5,170,599 A | 12/1992 | Knight |
| 5,288,266 A | 2/1994 | Halley |

(Continued)

FOREIGN PATENT DOCUMENTS

IL      87301      3/1996

(Continued)

OTHER PUBLICATIONS

"GrainPro SuperGrainbags", Jul. 2004, GrainPro, Inc. Concord MA, www.grainpro.com.

(Continued)

*Primary Examiner*—John Fitzgerald
(74) *Attorney, Agent, or Firm*—Daniel J. Swirsky; AlphaPatent Associates Ltd.

(57) ABSTRACT

A system to first verify an adequate degree of hermeticity of a hermetic container in providing safe storage of a commodity by retaining sufficient hermeticity in a closed container and if satisfactory, loading a commodity in the container to self-verify the continued safe storage of the commodity by retaining sufficient hermeticity to protect the commodity from the effects of at least one of oxygen, humidity, insects and micro-flora in a hermetic container on the commodity therein. The hermetic container has at least one self-verifying component for measuring a parameter internal to the container, during and after manufacture, before and after placement of a commodity therein, and for providing the measurement externally to the container.

5 Claims, 6 Drawing Sheets

U.S. PATENT DOCUMENTS

| | | |
|---|---|---|
| 5,363,605 A | 11/1994 | Handwerker |
| 6,186,713 B1 | 2/2001 | Bonerb |
| 6,609,354 B1 | 8/2003 | Villers et al. |
| 6,941,727 B2 | 9/2004 | Villers et al. |
| 2003/0152671 A1 | 8/2003 | Johnstone |
| 2005/0208157 A1 | 9/2005 | Navarro et al. |
| 2006/0198861 A1 | 9/2006 | Villers et al. |

FOREIGN PATENT DOCUMENTS

| | | |
|---|---|---|
| WO | WO99/28578 | 6/1999 |
| WO | WO99/45787 | 9/1999 |

OTHER PUBLICATIONS

"Silage Density and Dry Matter Loss in Silo Bags" by Mike Rankin, date unknown, http://www.uwex.edu/CES/croops/silobagdensity.htm.

Speech delivered on Jun. 7, 2007 by Sophie Mirabella to the Australian Wheat Board, http://www.silobag.com.au/home/.

Villers et al., "Development and Applications of the Hermetic Storage Technology," Proceeding of the 9th International Working Conference on Stored Product Protection, Oct. 15-18, 2006, Campinas, Sao Paulo, Brazil. Brazilian Post-harvest Association—ABRAPOS, Passo Fundo, RS, Brazil, 2006, pp. 719-729 (ISBN 8560234004).

SYSTEM AND METHOD FOR SELF-VERIFICATION OF SAFE STORAGE WITHIN HERMETICALLY SEALED CONTAINERS

FIELD OF THE INVENTION

The present invention relates to storage of commodities and, more particularly to a system and method for testing and self-verification of safe storage within a hermetically sealed container.

BACKGROUND OF THE INVENTION

For a large variety of agricultural commodities, such as cocoa, coffee, grains or cereals such as wheat, corn, or rice, protection during storage to avoid the direct and indirect effects of oxygen and excessive moisture on bulk or bagged stored commodities is important. Such effects include, but are not limited to, enabling insects and fungi to flourish. It is recognized that when commodities are harvested there is a high likelihood that along with the harvested commodity, whether cereal grains, pulses, oilseeds, nuts, spices, or the beans of beverages like coffee and cocoa, insects may be contained within the commodity. Also, stored commodities are often subject to rodent attacks. If left untreated, the insect infestations can result in a rapid growth in the number of insects and destruction of the commodity. In addition, the existence of insect infestations in many instances commonly necessitates fumigation to prevent large losses, particularly when the commodities are stored for extended periods of time or during shipment to foreign countries, to protect the recipient country from the spread of such insects, quarantine control treatments are necessary. The commodities are also subject to growth of molds and the consequent release of toxins such as aflatoxins and ochratoxins.

One approach to prevent these losses is to use pesticides, such as methyl bromide, which is harmful to the environment and specifically to the ozone layer of the upper atmosphere; therefore its use has been banned as of Jan. 2005 in developed countries. These pesticides are thereby released to the environment, or more typically, pesticides are added to the commodity immediately prior to or after shipping. The use of these pesticides is undesirable as some pesticides may have an adverse effect on the health of the consumer, the workers who handle it, or to the environment. Commodities may also be adversely affected by the effects of oxidation during storage such as increased levels of free fatty acids (FFAs), for example in cocoa beans or oil seeds such as peanuts or sunflower seeds. Increase in moisture content may occur due to exposure to high external humidity, which results in the growth of fungi and other micro-organisms in the commodity. Fungi and other micro-organisms impact on the quality, nutrition purposes, safety, purity, appearance, taste, aroma and freshness of the commodity or the germination capability of seeds and the subsequent vigor of resulting seedlings.

A well-known method for long term storage of a bulk commodity utilizes a hermetically sealed enclosure formed from a flexible, low gas-permeability plastic material employing the depletion of oxygen by respiration of live insects present in the commodity and by the commodity itself. This process takes significant time and depends in part on the level of infestation to deplete the oxygen. In addition, after the insects die, the oxygen level may gradually rise due to infiltration of air through the permeable membrane or leaks and it may thus permit various oxidation effects in the stored commodity. Further, the same hermetic storage level prevents significant infiltration of water vapor which otherwise might increase the moisture level in the stored commodity to unacceptable levels.

Systems and methods for long term storage of bulk commodities in a controlled environment have been disclosed. For example, a storage container originally termed "Cube" and now called Cocoon™ is a hermetic container, which is described in Israeli patent number 87301, U.S. Pat. No. 6,609,354 and in U.S. Pat. No. 6,941,727, all of which are incorporated herein by reference in their entireties.

Even with the success of such long term storage systems, it is difficult to know whether hermeticity has been sufficiently attained or maintained over long periods of time to prevent excessive rise in oxygen or of moisture levels in the commodity until the end of the storage period—which may be up to a year or more. Such systems do not inherently provide a way to detect whether hermeticity has been lost due to leakage unless representative parameters are regularly monitored and controlled. Therefore, it would be beneficial to have a system and method for providing an indication of conditions of hermeticity and humidity inside the container without having to open the container and without letting in outside air and further to have a system and method for providing an indication of conditions of hermeticity of a container prior to loading of a commodity therein.

SUMMARY OF THE INVENTION

According to one aspect of the invention, there is provided a method for testing hermeticity of a container prior to loading with a commodity. The method includes providing an empty container having a sampling valve and a port, providing a vacuum gauge attached to the container at the sampling valve, providing a suction device attached to a hose with a shut-off valve, the hose attached to the container at the port, sealing the container, pulling a vacuum in the container by operating the suction device, after the pulling the vacuum—closing the shut-off valve, and measuring a parameter via the vacuum gauge to determine the pre-loading hermeticity of the container. In some embodiments, the measured parameter is vacuum level and the measuring is done after a pre-determined period of time. In other embodiments, the measured parameter is time and the measuring is done after a pre-determined vacuum level is reached, as determined by the vacuum gauge.

According to one aspect of the invention there is provided a system for self-verifying of the safe storage of a commodity. The system includes a hermetic container for holding the commodity therein, a first self-verifying component at least partially exposed to an interior portion of the container, the first self-verifying component for measuring a first parameter in the interior portion of the container, and a second self-verifying component at least partially exposed to an interior portion of the container for measuring a second parameter in the interior portion of the container, wherein the second parameter is a different parameter than the first parameter. The first and second self-verifying components are further configured to provide a reading from time to time of the first and second parameters external to the container.

According to another aspect of the invention, there is provided a system for self-verifying of a commodity. The system includes a hermetic container for holding the commodity therein, the hermetic container including a top portion, a bottom portion and walls, and a humidity indicator strip built into one of the walls, the humidity indicator strip at least partially exposed to an interior portion of the hermetic container, wherein the humidity indicator strip is visible external to the hermetic container.

According to another aspect of the invention, there is provided a system for self-verifying a parameter or parameters of the safe storage of a commodity. The system includes a hermetic container for holding the commodity therein, a data logger positioned inside the hermetic container, and a receiver configured to communicate with the data logger, the receiver located external to the hermetic container.

According to yet another aspect of the invention there is provided a system for optionally first testing and then self-verifying a parameter required for the safe storage of a commodity. The system includes a hermetic container for holding the commodity therein, the hermetic container including a top portion, a bottom portion and walls and a hermetic zipper, a port positioned with a shut-off valve on at least one of the walls, equipped with a one way sampling valve, a suction device connectable to the port, and a vacuum gauge which is connectable to a suitable port, the vacuum gauge for measuring the vacuum level within the hermetic container for a pre-determined period of time.

According to yet another aspect of the invention there is provided a method for self-verification of the safe storage of a commodity. The method includes providing a container having at least one self-verifying component, placing the commodity into the container, hermetically sealing the container, measuring a first parameter from within the hermetically sealed container, providing the measured first parameter to a location external to the container, measuring a second parameter from within the hermetically sealed container, providing the measured second parameter to a location external to the container, and determining whether hermeticity of the container is adequate and the commodity is safely stored based on the measured first and second parameters.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The above and further advantages of the present invention may be better understood by referring to the following description in conjunction with the accompanying drawings in which.

Figure 1:
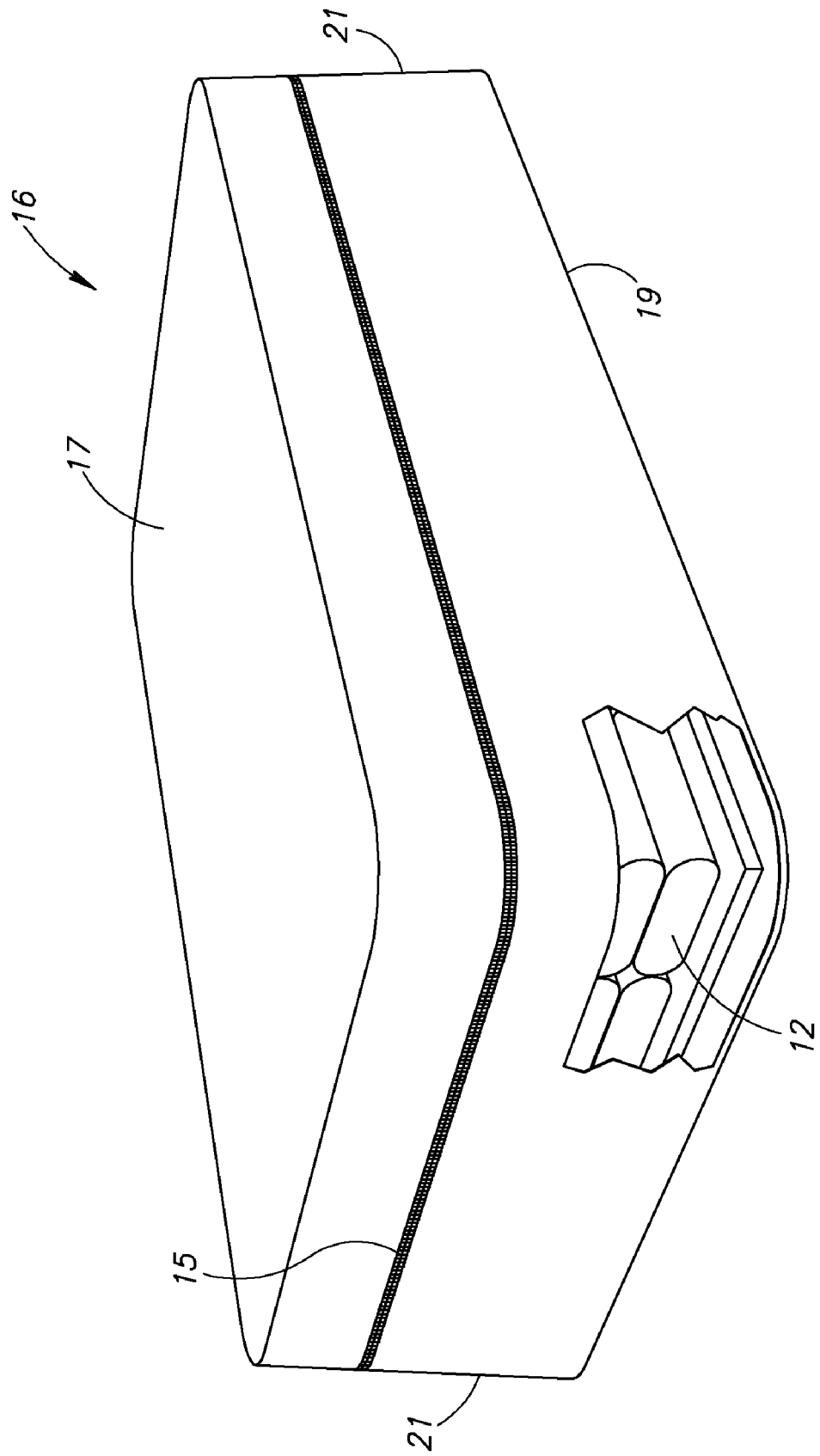
FIG. 1 is an illustration of a hermetic container having bags of a commodity placed therein.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the present invention. It will be understood by those of ordinary skill in the art that the present invention may be practiced without these specific details. In other instances, well-known methods, procedures, components and structures may not have been described in detail so as not to obscure the present invention.

The present invention is directed to an initially testable and self-verifying safe storage system suitable for long-term preservation and prevention of quality loss during storage of commodities. The principles and operation of a system and methods according to the present invention may be better understood with reference to the drawings and accompanying descriptions.

Before explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Reference is now made to FIG. 1, which is an illustration of a hermetic container 16 having bags 12 of a commodity placed therein. In one embodiment, hermetic container 16 is a Cocoon™ storage container (formerly called a "Cube") such as described in Israeli patent number 87301, U.S. Pat. No. 6,609,354 and in U.S. Pat. No. 6,941,727, all of which are incorporated herein by reference in their entireties. Briefly, a Cocoon™ storage container may be formed of a polyvinyl chloride material having a typical thickness of at least 0.813 mm (0.032 inches). It is a low air and water vapor-permeable container which deprives air and humidity to storage insects or microflora within the commodity, is slippery, and tough enough, when intentionally kept taut, to resist rodent penetration from the outside. In some instances, a vacuum pump is used to draw air to reduce the partial pressure of oxygen and other gases from the hermetic container 16, so that the commodity is rendered substantially free of live insects in a shorter time period. In other instances, an inert gas such as $CO_2$ or $N_2$ is pumped into container 16 so as to displace the air. Hermetic container 16 generally has a top portion 17 a bottom portion 19 and walls 21, and generally includes a hermetic zipper 15 forming a hermetically sealed storage structure.

Figure 2:
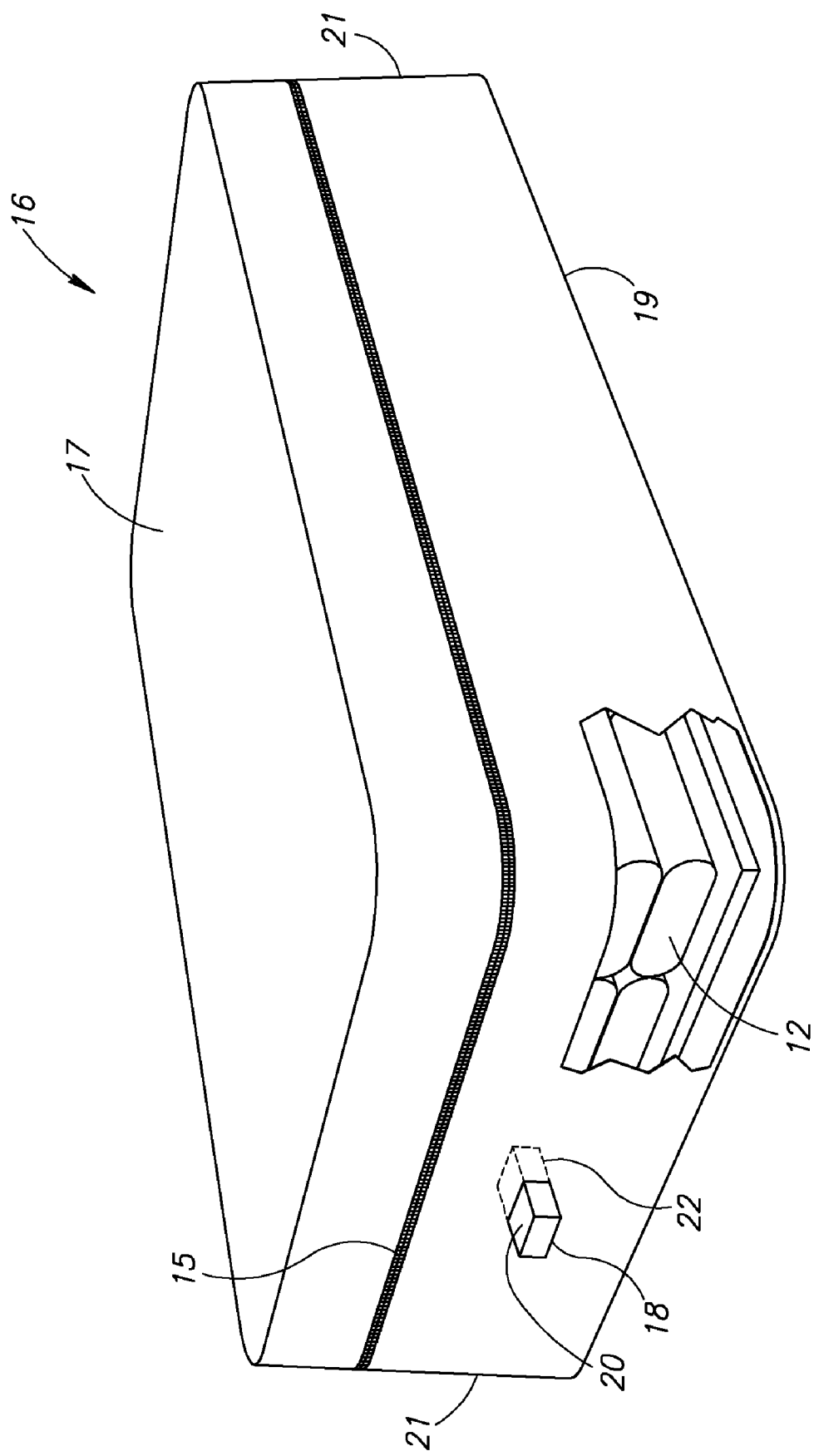
FIG. 2 is an illustration of the hermetic container of FIG. 1, further including a sampling valve.

Reference is now made to FIG. 2, which is an illustration of hermetic container 16 with a sampling valve 18. Sampling valve 18 is a one-way valve set into one of walls 21 of container 16, and is configured to allow sampling of air from inside container 16 without introducing air into container 16. Sampling valve 18 may be any commercially available one-way valve, such as, for example, those available from Carmo (Denmark) such as model #03-664. Sampling valve 18 has an external portion 20 and an internal portion 22, wherein external portion 20 is positioned external to wall 21 and internal portion 22 is positioned internally within container 16. Air drawn from internal portion 22 can be sampled via an oxygen meter or oxygen sensor. The oxygen meter may be a standard oxygen meter, such as commercially available from GrainPro #GP02-0583564. In some embodiments, the oxygen meter includes a tube which fits directly into external portion 20 of sampling valve 18. The oxygen meter may be analog or digital. An electric or hand pump, connected to both the oxygen meter and external portion 20, is used to remove a gas sample from container 16 through its connecting tube to the oxygen meter or sensor.

Figures 3A, 3B:
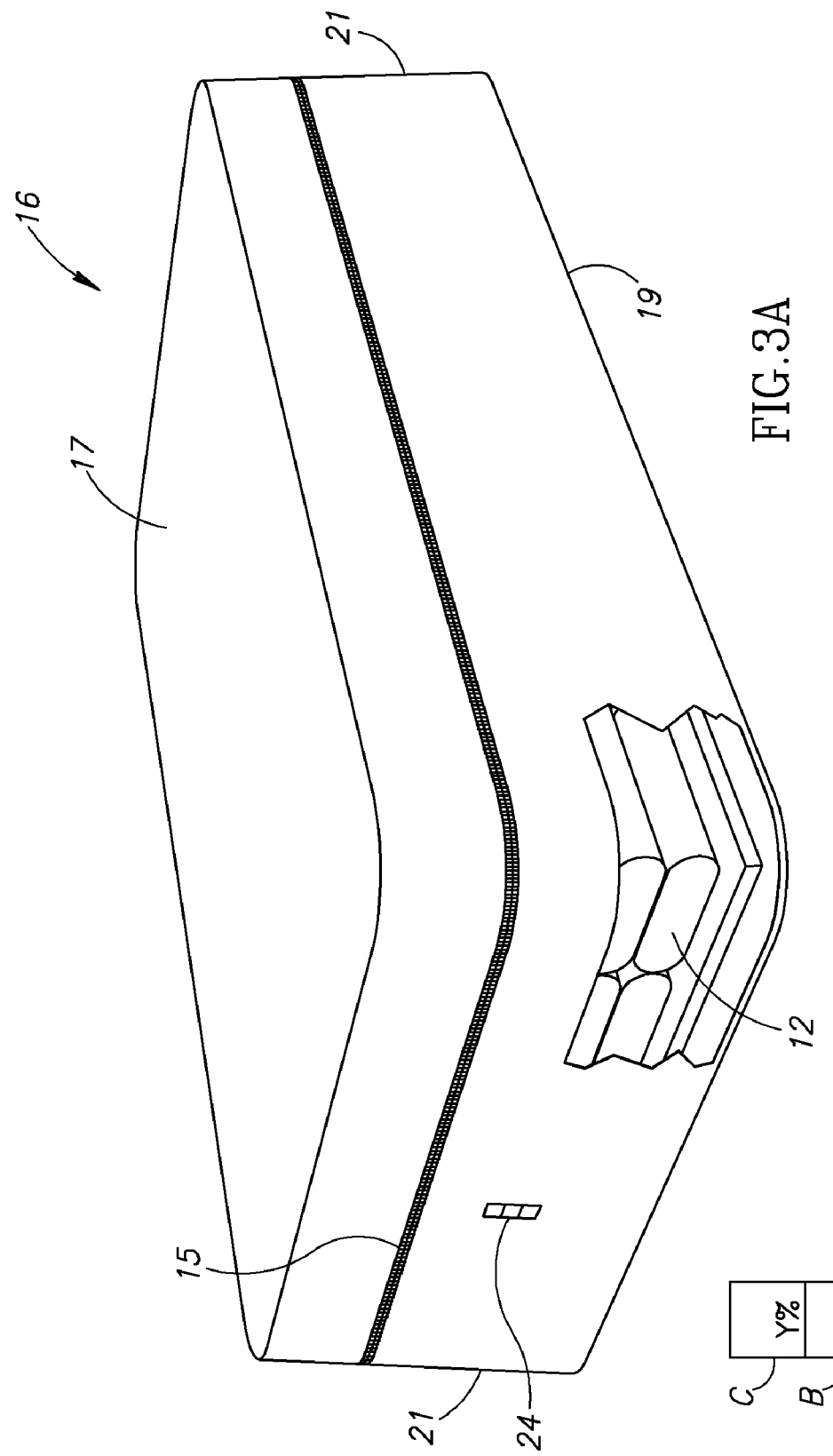
FIG. 3A is an illustration of the hermetic container of FIG. 1 with a humidity indicator.
FIG. 3B is an illustration of the indicator of FIG. 3A, in accordance with one embodiment.

Reference is now made to FIG. 3A, which is an illustration of hermetic container 16 with a humidity indicator 24. Indicator 24 is built into one or several of walls 21, and is externally visible via a window. In some embodiments, indicator 24 is a color changing indicator of humidity, wherein a color change displays the relative humidity within container 16. Indicator 24 may be, for example, a visual humidity indicator. It should be readily apparent that any suitable indicator may be used, and may include indications other than color, such as numbers, etc. As shown in FIG. 3B, indicator 24 in one embodiment is a color coded indicator with several segments such as model #357P, manufactured by AGM Container Controls Inc., Tucson, Ariz. For example, at a humidity of below X % air relative humidity, section A would change color, at humidity above Y %, sections A and B would change color, and at humidity above Z %, all three sections would darken or change color. X, Y, and Z may be set to change color at predetermined levels of humidity, for example, 60% 70% and 80%. It should be readily apparent that any number of sections may be used, depending on how specific the desired information is. As humidity increases, additional segments become highlighted. Thus, it is possible to view at a glance the range of the humidity level inside of container 16.

Figure 4:
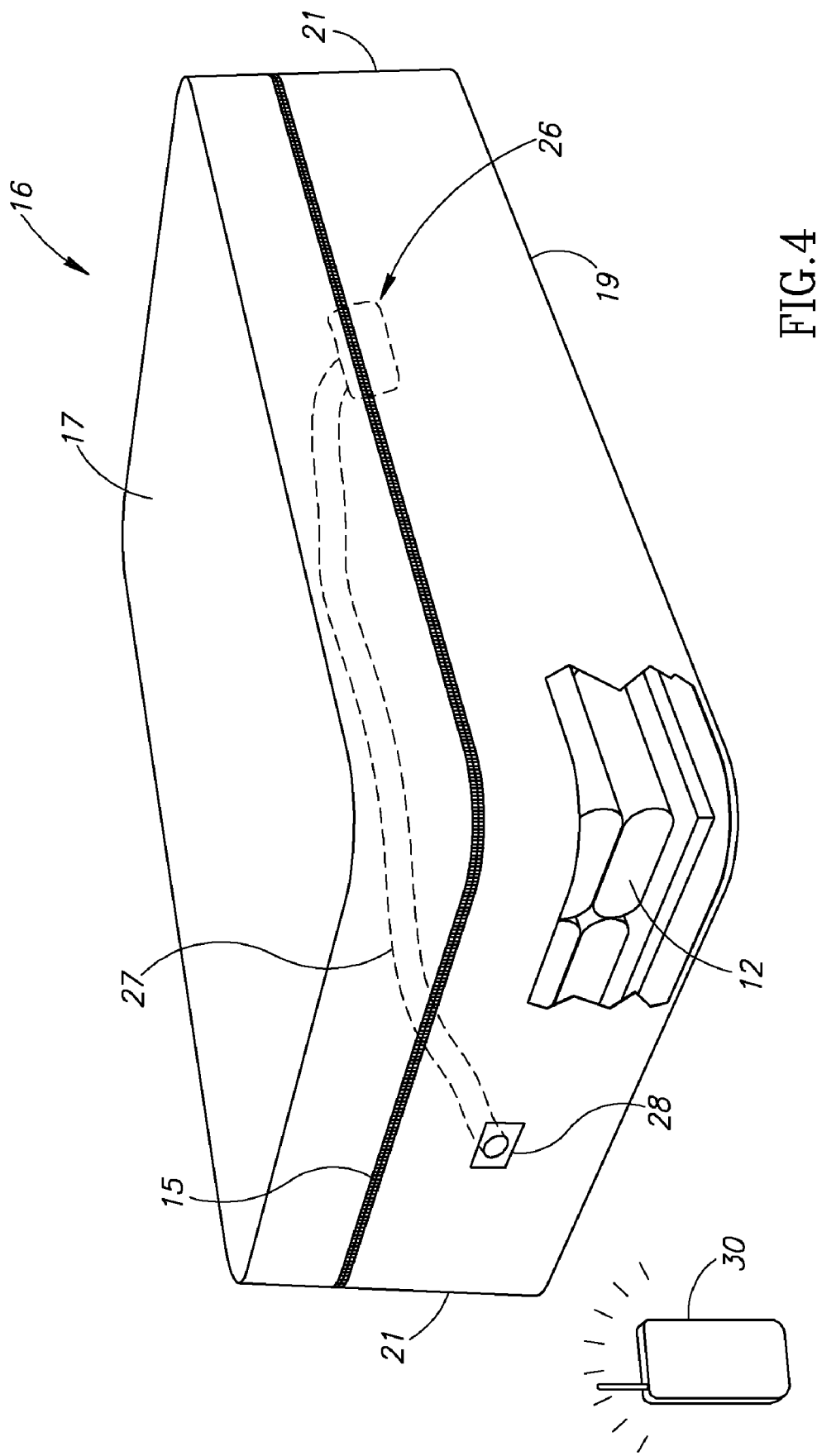
FIG. 4 is an illustration of the hermetic container of FIG. 1 with a data logger capable of measuring and storing at least temperature and humidity.

Reference is now made to FIG. 4, which is an illustration of hermetic container 16 with a data logger 26 positioned therein. Data logger 26 sits inside of hermetic container 16 and is connected by a cable 27 to an outlet 28. Outlet 28 may be, for example, a plug adapter having a two-sided connector, wherein cable 27 connects to an inner portion of the two-sided connector, and a receiver 30 can be connected to an outer portion of the two-sided connector. In one embodiment, data logger 26 is a wired data logger such as, for example, those available from Lascar Electronics (model #EL-USB-2). In another embodiment, data logger 26 is a wireless data logger, and no outlet 28 is needed. Data logger 26 is configured to store data such as oxygen level, carbon dioxide level, relative humidity, temperature or combinations thereof as a function of time. At regular intervals or on demand, receiver 30 samples data from data logger 26. In one embodiment, receiver 30 is a laptop or hand-held computer and may incorporate a technology such as "bluetooth", or may be any other type of short distance radio transmitter such as "WIFI". In another embodiment, receiver 30 is connected to outlet 28 external to container 16, and samples data from data logger 26 at regular intervals or on demand. In some embodiments, data logger 26 transmits information passively by selectively reflecting a signal such as in toll tags or garment tags which selectively reflect a microwave signal when illuminated to indicate a coded value.

Figure 5:
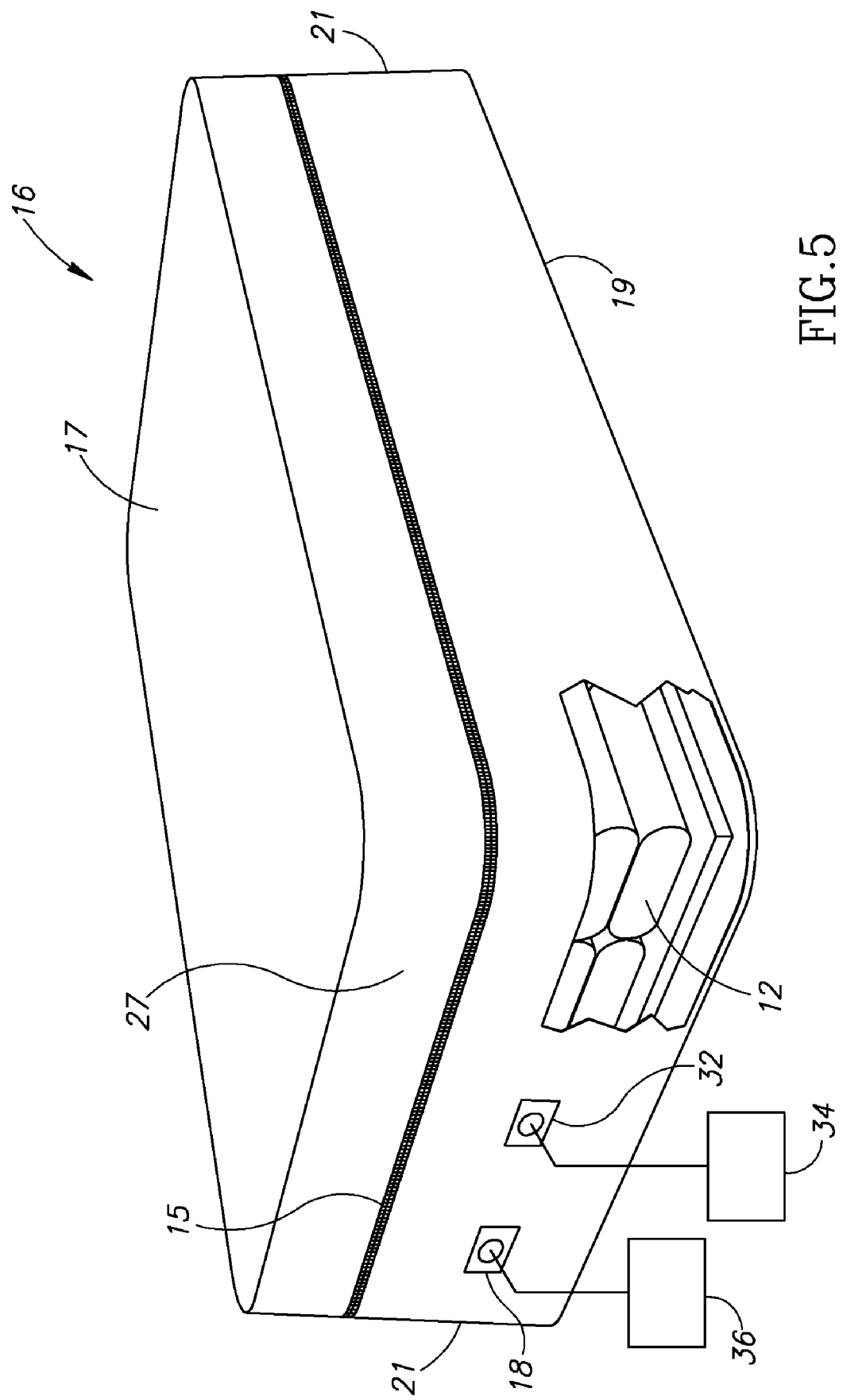
FIG. 5 is a schematic illustration of the hermetic container of FIG. 1 with a suction device and a vacuum gauge.

Reference is now made to FIG. 5, which is a schematic illustration of hermetic container 16 with a suction device 34 and a vacuum gauge 36. Hermetic container 16 has a suction port 32 which is connected to a suction device 34 and a sampling port 18 connected to vacuum gauge 36. In some embodiments, sampling port 18 and suction port 32 are separate ports, as depicted in FIG. 5. In other embodiments, sampling port 18 and suction port 32 are a single port, and a "T" connection is used to separately attach suction device 34 and vacuum gauge 36 thereto. Suction device 34 may be, for example, a battery operated suction device such as those found in portable vacuum cleaners or a vacuum pump. Vacuum gauge 36 may be, for example, a simple manometer—a "u" shaped tube partially filled with water, (with as little as 20 mm of water) or may be a conventional vacuum gauge. Suction device 34 is connected to container 16 via a hose with a shut-off valve. Suction device 34 creates a limited vacuum (in some embodiments approximately 20 mm water). Both suction device 34 and the shut-off valve are then shut off, and the degree of vacuum is measured and recorded by vacuum gauge 36. The time for decay of vacuum to a predetermined level, for example half its original value, is then measured and compared to a predetermined standard which represents the permissible maximum leakage rate for the given system. In one embodiment, such as a 5 ton capacity Cocoon the acceptable maximum time to reach half of its value is about ten minutes. Alternatively, the user can wait a predetermined amount of time and measure the change in the degree of vacuum during that time. Either way, the results give a measurement of hermeticity that indicates permeability or leakage rate from any number of causes. If the hermeticity is adequate for use as a hermetic store for a particular use, the vacuum decay time should remain at or below a predetermined level, for instance, 10 minutes.

In another embodiment used to test Cocoon's hermeticity before leaving the factory, measurements of vacuum change and/or time delay are taken as part of final inspection of shipment. An empty Cocoon is zipped together in sealed form on any flat surface. A vacuum pump capable of driving a vacuum of 100 mm Hg below atmosphere or more is securely attached to suction port 32 with an airtight connector via a hose, and a shut-off valve is provided on the hose. A vacuum gauge is connected to sampling port 18, similar to the embodiment described with respect to FIG. 5, but with the Cocoon being empty. Alternatively, sampling port 18 and suction port 32 are a single port, and a "T" connection is used to separately attach suction device 34 and vacuum gauge 36 thereto. The shut-off valve on the hose leading to the vacuum pump is provided so that after reaching an arbitrary vacuum level such as 100 mm Hg below atmosphere, the shut-off valve is closed. The time (typically in seconds) for leakage to reduce the vacuum level to, for example, ½ its value is measured, and is then compared on a "go-no-go" basis for that Cocoon to the quality standard established for that size Cocoon. If "no-go", repair action is initiated to bring the Cocoon to standard. The number of seconds obtained may be permanently recorded on the Cocoon. It should be taken into account, however, that the value for an empty Cocoon with its very small contained volume is typically much shorter than for a Cocoon with 50% or more total volume of the Cocoon occupied by air. It should be noted that the above method for testing initial hermeticity was unexpectedly successful when tested, as it was previously thought that a vacuum of the level necessary for such testing would not be sufficiently distributed in a flat, large, airless container such as a Cocoon™, where the top and bottom portions of the cocoon surface might form an airtight blockage.

Some or all of the above methods may be combined thus creating a multi-parameter self-verifying safe storage system. It should be readily apparent that any other method of sampling the inner contents of hermetic container 16 without compromising the hermeticity of the container 16 may be employed. For example, container 16 may include a sampling valve 18 with an oxygen meter, as in the embodiment described with respect to FIG. 2, as well as a visual humidity indicator 24, such as described with respect to FIG. 3. Alternatively, container 16 may include a sampling valve with an oxygen meter, and may further include a port for suction or may be combined with an electrical connector to connect to data logger 26. Any and all of the described embodiments may be combined to provide a multi-parameter self-verifying safe storage within the hermetic container.

Figure 6:
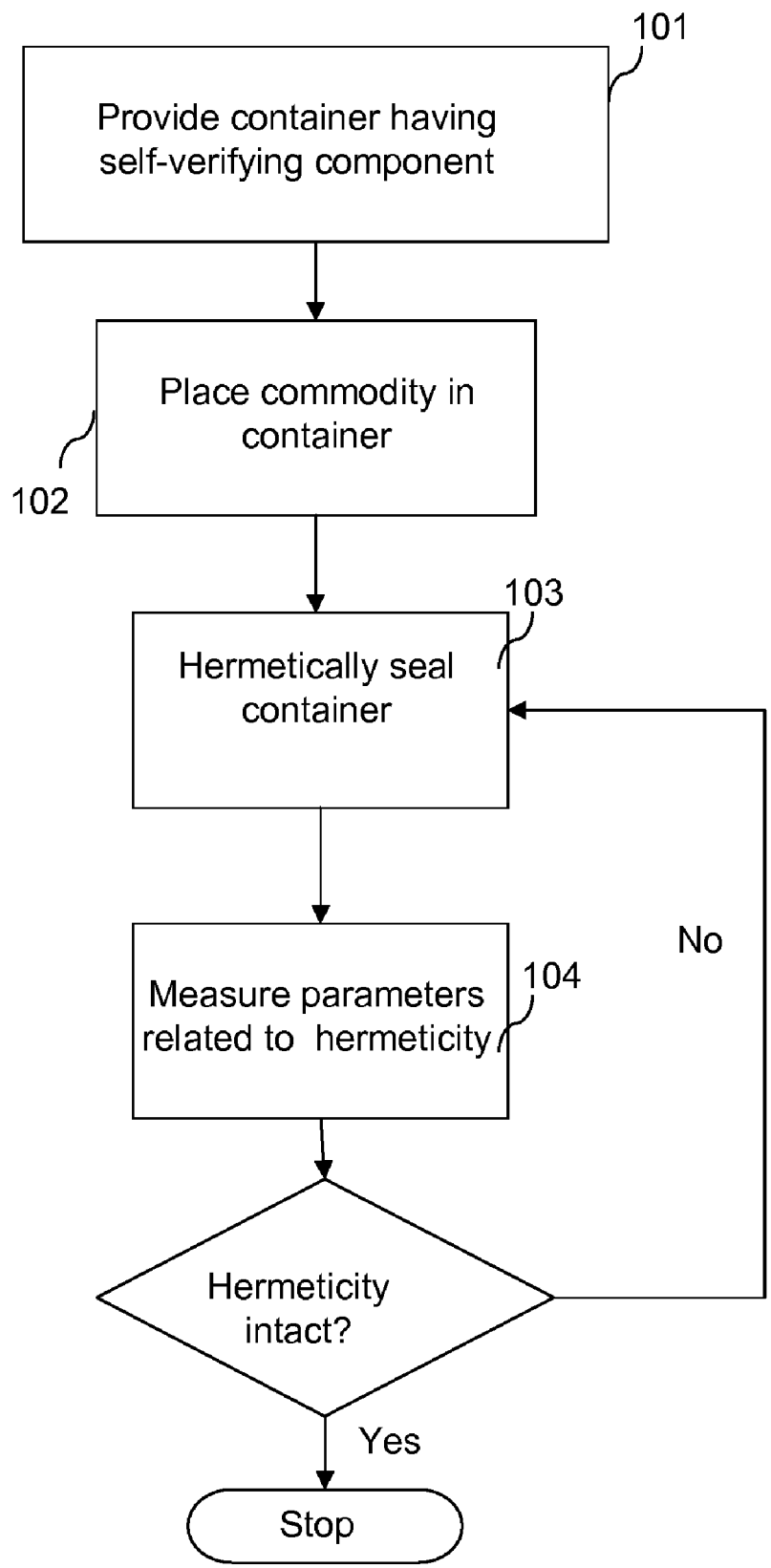
FIG. 6 is a flow-chart diagram illustration of a method of detecting a parameter within a hermetic container such as the ones depicted in FIGS. 1-5.

Reference is now made to FIG. 6, which is a flow-chart diagram illustration of a method of detecting a parameter within a hermetic container. First, a container is provided (step 101), the container having a self-verifying component. Next, a commodity is placed in the container (step 102), and the container is hermetically sealed (step 103). In some embodiments—when performed for initial testing—no commodity is placed in the container prior to sealing. For many commodities, infesting insects including eggs, larva, pupae and adult insects preferably at room temperature or above consume the available oxygen in combination with any respiration of the commodity itself or its microflora in a period of days to a few weeks and die. For some commodities such as coffee, oxygen levels may vary little but relative humidity must reach and remain at a low level such as below 65% relative humidity for safe storage. During long-term storage, parameters are periodically measured (step 104) via the self-verifying component. Parameters may include, for example, oxygen level, carbon dioxide level, humidity, or temperature change over time, or the time to reach for a particular test vacuum level to decay to ½ its value or combinations thereof. If measured parameters show that hermeticity and storability is sufficient, then measuring is complete for the particular round of measurements. If measured parameters show that adequate hermeticity or storability may be compromised, the container is fixed if necessary and re-sealed (step 103) and parameters are re-measured (step 104). Alternatively, if adequate hermeticity and storability of the stored commodity cannot be maintained and safe storage is or has been compromised the commodity can be removed. In one embodiment, typically at the factory, as described above, testing is done prior to placing the commodity in the container to insure the sufficient hermeticity of the hermetic store. If hermeticity is acceptable, the hermetic container is suitable for use by placing commodities to be protected inside. If not, repairs are made to the container, and the container is re-tested.

While certain features of the present invention have been illustrated and described herein, many modifications, substitutions, changes, and equivalents may occur to those of ordinary skill in the art. It is, therefore, to be understood that the appended claims are intended to cover all such modifications and changes as fall within the true spirit of the present invention.

What is claimed is:

1. A method for determining a condition of a commodity within a hermetically sealed container, the method comprising:

providing a container having a sampling valve;
   placing the commodity into said container;
   hermetically sealing said container;
   measuring a first parameter from within said hermetically sealed container, wherein said measuring is done via said sampling valve;
   providing said measured first parameter to a location external to said container;
   measuring a second parameter from within said hermetically sealed container;
   providing said measured second parameter to a location external to said container;
   determining whether hermeticity of said container is adequate to protect the commodity based on said measured first parameter; and
   determining a condition of the commodity based on said second parameter.

2. The method of claim 1, wherein said second parameter is at least one of: oxygen level, carbon dioxide level, humidity, and interior temperature.

3. The method of claim 1, wherein said sampling valve comprises a vacuum gauge, and wherein said first parameter is vacuum decay time and said measuring said first parameter is done after reaching a predetermined vacuum level as determined by said vacuum.

4. The method of claim 1, wherein said sampling valve comprises a manometer.

5. The method of claim 1, wherein said second parameter is measured via a sampling valve.

* * * * *